United States Patent
Clark et al.

(10) Patent No.: US 9,303,106 B1
(45) Date of Patent: Apr. 5, 2016

(54) PROCESSES FOR PREPARING SOLID METALLOCENE-BASED CATALYST SYSTEMS

(71) Applicant: Chevron Phillips Chemical Company LP, The Woodlands, TX (US)

(72) Inventors: Kensha M. Clark, Tulsa, OK (US); Qing Yang, Bartlesville, OK (US); Gary L. Glass, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/517,158

(22) Filed: Oct. 17, 2014

(51) Int. Cl.
    *C08F 4/6592* (2006.01)
    *C08F 210/16* (2006.01)
    *C08F 110/02* (2006.01)
    *C08F 4/659* (2006.01)

(52) U.S. Cl.
    CPC ............ *C08F 110/02* (2013.01); *C08F 4/6592* (2013.01); *C08F 4/65912* (2013.01); *C08F 4/65916* (2013.01); *C08F 210/16* (2013.01)

(58) Field of Classification Search
    CPC ............ C08F 4/65912; C08F 4/65916; C08F 4/6592; C08F 210/16; B01J 31/2265
    See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk et al. | |
| 4,588,790 A | 5/1986 | Jenking, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,498,581 A | 3/1996 | Welch et al. | |
| 5,565,175 A | 10/1996 | Hottovy et al. | |
| 5,575,979 A | 11/1996 | Hanson | |
| 6,107,230 A | 8/2000 | McDaniel et al. | |
| 6,165,929 A | 12/2000 | McDaniel et al. | |
| 6,166,152 A | 12/2000 | Benham et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,534,609 B2 | 3/2003 | Mitchell et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,680,417 B2 | 1/2004 | Bagheri et al. | |
| 6,750,302 B1 | 6/2004 | McDaniel et al. | |
| 6,833,415 B2 | 12/2004 | Kendrick et al. | |
| 6,852,660 B2 | 2/2005 | Mitchell et al. | |
| 7,026,494 B1 | 4/2006 | Yang et al. | |
| 7,041,617 B2 | 5/2006 | Jensen et al. | |
| 7,199,073 B2 | 4/2007 | Martin | |
| 7,226,886 B2 | 6/2007 | Jayaratne et al. | |
| 7,294,599 B2 | 11/2007 | Jensen et al. | |
| 7,312,283 B2 | 12/2007 | Martin et al. | |
| 7,341,971 B2 | 3/2008 | Denifl et al. | |
| 7,517,939 B2 | 4/2009 | Yang et al. | |
| 7,601,665 B2 | 10/2009 | McDaniel et al. | |
| 7,619,047 B2 | 11/2009 | Yang et al. | |
| 7,803,324 B2 | 9/2010 | Burns et al. | |
| 7,884,163 B2 | 2/2011 | McDaniel et al. | |
| 7,919,639 B2 | 4/2011 | Murray et al. | |
| 8,080,681 B2 | 12/2011 | Murray et al. | |
| 8,309,485 B2 | 11/2012 | Yang et al. | |
| 8,420,562 B2 | 4/2013 | Elo et al. | |
| 8,691,715 B2 | 4/2014 | Yang et al. | |
| 8,754,177 B2 | 6/2014 | Crowther et al. | |
| 9,163,098 B2 | 10/2015 | McDaniel et al. | |
| 2003/0207762 A9 | 11/2003 | Wenzel et al. | |
| 2005/0288461 A1* | 12/2005 | Jensen et al. ................... | 526/127 |
| 2009/0240010 A1* | 9/2009 | McDaniel et al. ............ | 526/130 |
| 2010/0010174 A1 | 1/2010 | McDaniel et al. | |
| 2014/0114039 A1 | 4/2014 | Benham et al. | |
| 2015/0197582 A1 | 7/2015 | Cymbaluk et al. | |

FOREIGN PATENT DOCUMENTS

| | | |
|---|---|---|
| EP | 0 327 649 | 8/1989 |
| EP | 0602716 | 6/1994 |
| EP | 1 693 388 | 8/2006 |
| EP | 2 346 912 | 9/2012 |

OTHER PUBLICATIONS

U.S. Appl. No. 14/751,226, filed Jun. 26, 2015, Clark, et al., entitled "Processes for Preparing Metallocene-Based Catalyst Systems in Cyclohexene".
*Modern Plastics Encyclopedia*, Mid-Nov. 1995 Issue, vol. 72, No. 12, 3 pages.
*Film Extrusion Manual—Process, Materials, Properties*, TAPPI Press, 1992, 16 pages.
International Search Report, PCT/US2015/055327, dated Feb. 1, 2016, 6 pages.

* cited by examiner

*Primary Examiner* — Caixia Lu

(74) *Attorney, Agent, or Firm* — Merchant & Gould P.C.

(57) ABSTRACT

Methods for preparing metallocene-based catalyst systems containing an activator-support are disclosed. These methods can include contacting a solid metallocene compound, an activator-support, and an organoaluminum compound, resulting in catalyst systems with increased catalytic activity as compared to catalyst systems utilizing a solution of the metallocene compound.

22 Claims, No Drawings

PROCESSES FOR PREPARING SOLID METALLOCENE-BASED CATALYST SYSTEMS

BACKGROUND OF THE INVENTION

There are various methods used to prepare metallocene catalyst systems containing an activator-support. These catalyst systems can be used to polymerize olefins to produce olefin-based polymers, such as ethylene/α-olefin copolymers. For the same initial components of the catalyst system, it would be beneficial for these catalyst systems to have higher catalyst activity as a result of the method used to prepare the catalyst system. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing the catalyst compositions, methods for using the catalyst compositions to polymerize olefins, the polymer resins produced using such catalyst compositions, and articles produced using these polymer resins. In particular, the present invention relates to methods of preparing metallocene-based catalyst compositions, and to the resultant catalyst compositions. Catalyst compositions of the present invention can be used to produce, for example, ethylene-based homopolymers and copolymers.

Various processes and methods related to the preparation of metallocene catalyst compositions are disclosed herein. In one aspect, a process for producing a catalyst composition is provided herein, and in this aspect, the process can comprise contacting, in any order, (a) an activator-support, (b) a solid metallocene compound, and (c) an organoaluminum compound, to produce the catalyst composition. In another aspect, a process for producing a catalyst composition is provided, and in this aspect, the process can comprise (i) contacting an activator-support and a solid metallocene compound for a first period of time to form a precontacted mixture, and (ii) contacting the precontacted mixture with an organoaluminum compound for a second period of time to produce the catalyst composition. While not wishing to be bound by theory, Applicants believe that metallocene-based catalyst compositions, prepared as described herein using a solid metallocene compound, can have unexpected increases in catalytic activity.

Catalyst compositions also are encompassed by the present invention. In one aspect, the catalyst composition can comprise (a) an activator-support, (b) a solid metallocene compound, and (c) an organoaluminum compound. In another aspect, the catalyst composition can comprise (i) a precontacted mixture comprising an activator-support and a solid metallocene compound, and (ii) an organoaluminum compound.

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the metallocene-based catalyst systems disclosed herein, for instance, any of the solid metallocene compounds, any of activator-supports, and any of the organoaluminum compounds disclosed herein.

Polymers produced from the polymerization of olefins, resulting in homopolymers, copolymers, terpolymers, etc., can be used to produce various articles of manufacture.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator-support," "a solid metallocene compound," etc., is meant to encompass one, or mixtures or combinations of more than one, activator-support, solid metallocene compound, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence or absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of a first metallocene compound to a second metallocene compound can be in a range from about 1:10 to about 10:1 in certain aspects. By a disclosure that the weight ratio can be in a range from about 1:10 to about 10:1, Applicants intend to recite that the weight ratio can be any weight ratio within the range and, for example, can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process can involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the organoaluminum compound, the metallocene compound, or the activator-support, after combining these components. Therefore, the terms "catalyst composition," "catalyst mixture," "catalyst system," and the like, can encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe methods and compositions wherein the components are combined or contacted together in any order, in any manner, and for any length of time, unless otherwise specified. For example, the components can be contacted by blending or mixing. Further, unless otherwise specified, the contacting of any component can occur in the presence or absence of any other component of the methods and compositions described herein. Combining additional materials or components can be done by any suitable method. These terms encompass mixtures, blends, solutions, slurries, reaction products, and the like, as well as combinations thereof.

A "precontacted mixture" describes a mixture of catalyst components that are combined or contacted for a period of time prior to being contacted with other catalyst components. According to this description, it is possible for the components of the precontacted mixture, once contacted, to have reacted to form at least one chemical compound, formulation, species, or structure different from the distinct initial compounds or components used to prepare the precontacted mixture.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are methods for preparing metallocene-based catalyst compositions containing a solid metallocene compound and an activator-support. Polymerization processes utilizing these catalyst compositions also are disclosed.

Methods for Preparing Catalyst Compositions

Various processes for preparing a catalyst composition containing a metallocene compound (one or more), an activator-support, and an organoaluminum compound are disclosed and described. One such process for producing a catalyst composition can comprise (or consist essentially of, or consist of):

(i) contacting an activator-support and a solid metallocene compound for a first period of time to form a precontacted mixture; and (ii) contacting the precontacted mixture with an organoaluminum compound for a second period of time to produce the catalyst composition.

Generally, the features of any of the processes disclosed herein (e.g., the activator-support, the organoaluminum compound, the solid metallocene compound, the first period of time, the second period of time, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

Step (i) of the process often can be referred to as the precontacting step, and in the precontacting step, an activator-support can be combined with a solid metallocene compound for a first period of time to form a precontacted mixture. The precontacting step can be conducted at a variety of temperatures and time periods. For instance, the precontacting step can be conducted at a precontacting temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other aspects, these temperature ranges also are meant to encompass circumstances where the precontacting step is conducted at a series of different temperatures, instead of at a single fixed temperature, falling within the respective ranges.

The duration of the precontacting step (the first period of time) is not limited to any particular period of time. Hence, the first period of time can be, for example, in a time period ranging from as little as 1-10 seconds to as long as 24-48 hours, or more. The appropriate first period of time can depend upon, for example, the precontacting temperature, the amounts of the activator-support and the solid metallocene compound in the precontacted mixture, the presence of a diluent in the precontacting step, and the degree of mixing, among other variables. Generally, however, the first period of time can be at least about 5 sec, at least about 10 sec, at least about 30 sec, at least about 1 min, at least about 5 min, at least about 10 min, and so forth. Typical ranges for the first period of time can include, but are not limited to, from about 1 sec to about 48 hr, from about 10 sec to about 48 hr, from about 30 sec to about 24 hr, from about 30 sec to about 6 hr, from about 1 min to about 12 hr, from about 5 min to about 24 hr, or from 10 min to about 8 hr, and the like.

Often, one or both of the activator-support and the solid metallocene compound can be present as a slurry. In some aspects, the activator-support can be present as a slurry of the activator-support in a first diluent. Additionally or alternatively, the solid metallocene compound can be present as a slurry of the solid metallocene compound in a second diluent. Consistent with aspects of this invention, the first diluent and/or the second diluent can comprise a hydrocarbon that does not dissolve the solid metallocene compound, and moreover, the first diluent and the second diluent can be the same or different. For instance, the first diluent and/or the second diluent can comprise any suitable non-polar hydrocarbon, and the first diluent and the second diluent can be the same or different. Illustrative and non-limiting examples of diluents can include, but are not limited to, propane, cyclohexane, isobutane, n-butane, n-pentane, isopentane, neopentane, n-hexane, and the like, or combinations thereof; or alternatively, isobutane, isopentane, neopentane, or combinations thereof.

Thus, in one aspect, the precontacting step can be conducted by combining a slurry of the activator-support in a first diluent with a slurry of the solid metallocene compound in the same or a different diluent (a second diluent), and mixing to ensure sufficient contacting of the activator-support and the solid metallocene compound. In another aspect, the precontacting step can be conducted by combining the solid metallocene compound (dry) with a slurry of the activator-support in a diluent, and mixing to ensure sufficient contacting of the activator-support and the solid metallocene compound. In yet another aspect, the precontacting step can be conducted by combining the activator-support (dry) with a slurry of the solid metallocene compound in a diluent, and mixing to ensure sufficient contacting of the activator-support and the solid metallocene compound. In yet another aspect, the precontacting step can be conducted by combining dry activator-support with dry solid metallocene compound, and mixing to ensure sufficient contacting of the activator-support and the solid metallocene compound. Accordingly, any suitable procedure known to those of skill in the art for contacting or combining the activator-support and the solid metallocene compound can be employed.

In step (ii) of the process, the precontacted mixture (often, a slurry) can be contacted with an organoaluminum compound for a second period of time to form the catalyst composition. Step (ii), likewise, can be conducted at a variety of temperatures and time periods. For instance, step (ii) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other aspects, these temperature ranges also are meant to encompass circumstances where step (ii) is conducted at a series of different temperatures, instead of at a single fixed temperature, falling within the respective ranges. As an example, the precontacted mixture and the organoaluminum compound can be contacted at an elevated temperature, following by cooling to a lower temperature for longer term storage of the finished catalyst composition.

The second period of time is not limited to any particular period of time. Hence, the second period of time can range from as little as 1-10 seconds to as long as 24-48 hours, or more. The appropriate second period of time can depend upon, for example, the temperature, the amounts of the precontacted mixture and the organoaluminum compound, the presence of diluents in step (ii), the degree of mixing, and considerations for long term storage, among other variables. Generally, however, the second period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

Often, step (ii) can be conducted by combining the precontacted mixture (e.g., a dry mix, a slurry) with a solution of the organoaluminum compound in the same or a different diluent present in the precontacted mixture, and mixing to ensure sufficient contacting of the organoaluminum compound and the precontacted mixture (e.g., the activator-support previously combined with the solid metallocene compound). However, as described herein, any suitable procedure known to those of skill in the art for thoroughly contacting or combining the organoaluminum compound with the other catalyst system components can be employed. In some aspects, the organoaluminum compound can be present as a solution in any suitable hydrocarbon solvent, non-limiting examples of which can include cyclohexane, isobutane, n-butane, n-pentane, isopentane, neopentane, hexane, heptane, and the like, as well as combinations thereof.

In a particular aspect consistent with this invention, the process for producing a catalyst composition can comprise (or consist essentially of, or consist of) (i) contacting an activator-support and a solid metallocene compound for a first period of time to form a precontacted mixture; and (ii) contacting the precontacted mixture with an organoaluminum compound for a second period of time to produce the catalyst composition; and wherein the solid metallocene compound is not dissolved into solution during the catalyst preparation process.

In a related aspect, a catalyst composition consistent with this invention can comprise (i) a precontacted mixture comprising an activator-support and a solid metallocene compound; and (ii) an organoaluminum compound.

Unexpectedly, these catalyst compositions and methods of their preparation can result in improvements in catalyst activity. For instance, the activity of the catalyst composition can be greater (e.g., by at least about 1%, by at least about 5%, by at least about 10%, by at least about 25%, by at least about 35%, etc.) than that of a catalyst system obtained by using a solution of the metallocene compound (e.g., in an aromatic hydrocarbon solvent, such as toluene) instead of the solid metallocene compound, when compared under the same polymerization conditions. The same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the use of a solid metallocene compound instead of a solution of the metallocene compound in the preparation of the catalyst system, i.e., the metallocene compound as a solid component versus a liquid phase component.

In another aspect, the activity of the catalyst composition can be from about 1% to about 200% greater, from about 1% to about 100% greater, from about 5% to about 150% greater, from about 5% to about 75% greater, or from about 5% to about 50% greater, etc., than that of a catalyst system obtained by using a solution of the metallocene compound instead of the solid metallocene compound. Again, this comparison is under the same polymerization conditions, such that the only difference is the use of a solid metallocene compound instead of a solution of the metallocene compound in the preparation of the catalyst system, i.e., the metallocene compound as a solid component versus a liquid phase component.

In other aspects of this invention, a process for preparing a catalyst composition containing a metallocene compound, an activator-support, and an organoaluminum compound can comprise (or consist essentially of, or consist of) contacting, in any order:

(a) an activator-support;
(b) a solid metallocene compound; and
(c) an organoaluminum compound;

to produce the catalyst composition.

Generally, the features of this process (e.g., the activator-support, the organoaluminum compound, the solid metallocene compound, the order of contacting, among others) are independently described herein, and these features can be combined in any combination to further describe this process. Moreover, other process steps can be conducted before, during, and/or after any of the steps listed in this process, unless stated otherwise. Additionally, catalyst compositions produced in accordance with the this process are within the scope of this disclosure and are encompassed herein.

In this process, the activator-support, the solid metallocene compound, and the organoaluminum compound can be contacted or combined in any order, and under any suitable conditions, to form the catalyst composition. Thus, a variety of temperatures and time periods can be employed. For instance, the catalyst components can be contacted a temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other aspects, these temperature ranges also are meant to encompass circumstances where the components are contacted at a series of different temperatures, instead of at a single fixed temperature, falling within the respective ranges. As an example, the initial contacting of the components of the catalyst system can be conducted at an elevated temperature, following by cooling to a lower temperature for longer term storage of the finished catalyst composition. The duration of the contacting of the components to form the catalyst composition is not limited to any particular period of time. Hence, this period of time can be, for example, from as little as 1-10 seconds to as long as 24-48 hours, or more.

The appropriate period of time can depend upon, for example, the contacting temperature, the respective amounts of the activator-support, solid metallocene, and organoaluminum compound to be contacted or combined, the presence of diluents, the degree of mixing, and considerations for long term storage, among other variables. Generally, however, the period of time for contacting can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the contacting time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

Often, one or both of the activator-support and the solid metallocene compound can be present as a slurry. In some aspects, the activator-support can be present as a slurry of the activator-support in a first diluent. Additionally or alternatively, the solid metallocene compound can be present as a slurry of the solid metallocene compound in a second diluent.

Consistent with aspects of this invention, the first diluent and/or the second diluent can comprise a hydrocarbon that does not dissolve the solid metallocene compound, and moreover, the first diluent and the second diluent can be the same or different. For instance, the first diluent and/or the second diluent can comprise any suitable non-polar hydrocarbon, and the first diluent and the second diluent can be the same or different. Illustrative and non-limiting examples of diluents can include, but are not limited to, propane, cyclohexane, isobutane, n-butane, n-pentane, isopentane, neopentane, n-hexane, and the like, or combinations thereof. Often, the organoaluminum compound can be present as a solution in any suitable hydrocarbon solvent, non-limiting examples of which can include cyclohexane, isobutane, n-butane, n-pentane, isopentane, neopentane, hexane, heptane, and the like, as well as combinations thereof; or alternatively, isobutane, isopentane, neopentane, or combinations thereof.

In one aspect, the catalyst composition can be prepared by first contacting the organoaluminum compound and the activator-support, and then combining the solid metallocene compound, and mixing to ensure sufficient contacting of all components. In another aspect, the catalyst composition can be prepared by first contacting the organoaluminum compound and the solid metallocene compound, and then combining the activator-support, and mixing to ensure sufficient contacting of all components. In yet another aspect, the catalyst composition can be prepared by combining the organoaluminum compound, the activator-support, and the solid metallocene compound substantially contemporaneously, and mixing to ensure sufficient contacting of all components. For each of these orders of addition, the activator-support can be present as a slurry in a first diluent or, alternatively, the activator-support can be present as a dry solid. Likewise, the solid metallocene compound can be present as a slurry in a second diluent (same as or different from the first diluent) or, alternatively, the solid metallocene compound can be present as a dry solid. In these and other aspects, the organoaluminum compound can be present as a solution in a suitable hydrocarbon solvent.

Thus, in one aspect, the catalyst composition can be prepared by combining a slurry of the activator-support in a first diluent, a slurry of the solid metallocene compound in a second diluent, and a solution of the organoaluminum compound, and mixing to ensure sufficient contacting of all components. In another aspect, the catalyst composition can be prepared by combining the solid metallocene compound (dry), a slurry of the activator-support in a first diluent, and a solution of the organoaluminum compound, and mixing to ensure sufficient contacting of all components. In yet another aspect, the catalyst composition can be prepared by combining the activator-support (dry), a slurry of the solid metallocene compound in a second diluent, and a solution of the organoaluminum compound, and mixing to ensure sufficient contacting of all components. In yet another aspect, the catalyst composition can be prepared by combining dry activator-support, dry solid metallocene compound, and a solution of the organoaluminum compound, and mixing to ensure sufficient contacting of all components. As discussed herein, the activator-support, the organoaluminum compound, and the solid metallocene compound can be contacted or combined in any order.

In a particular aspect consistent with this invention, the process for producing a catalyst composition can comprise (or consist essentially of, or consist of) contacting, in any order, (a) an activator-support, (b) a solid metallocene compound, and (c) an organoaluminum compound, to produce the catalyst composition; and wherein the solid metallocene compound is not dissolved into solution during the catalyst preparation process.

In a related aspect, a catalyst composition consistent with this invention can comprise (a) an activator-support, (b) a solid metallocene compound, and (c) an organoaluminum compound.

Unexpectedly, these catalyst compositions and methods of their preparation can result in improvements in catalyst activity. For instance, the activity of the catalyst composition can be greater (e.g., by at least about 1%, by at least about 5%, by at least about 10%, by at least about 25%, by at least about 35%, etc.) than that of a catalyst system obtained by using a solution of the metallocene compound (e.g., in an aromatic hydrocarbon solvent, such as toluene) instead of the solid metallocene compound, when compared under the same polymerization conditions. The same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the use of a solid metallocene compound instead of a solution of the metallocene compound in the preparation of the catalyst system, i.e., the metallocene compound as a solid component versus a liquid phase component.

In another aspect, the activity of the catalyst composition can be from about 1% to about 200% greater, from about 1% to about 100% greater, from about 5% to about 150% greater, from about 5% to about 75% greater, or from about 5% to about 50% greater, etc., than that of a catalyst system obtained by using a solution of the metallocene compound instead of the solid metallocene compound. Again, this comparison is under the same polymerization conditions, such that the only difference is the use of a solid metallocene compound instead of a solution of the metallocene compound in the preparation of the catalyst system, i.e., the metallocene compound as a solid component versus a liquid phase component.

Consistent with certain aspects of this invention, the catalyst composition and the method of preparing the catalyst composition can comprise more than one metallocene compound. In such instance, the weight ratio of the first metallocene compound to the second metallocene compound can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene compound to the second metallocene compound can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Generally, in the catalyst compositions and methods of their preparation disclosed herein, the weight ratio of activator-support(s) to organoaluminum compound(s) can be in a range from about 1:10 to about 1000:1, or from about 1:5 to about 1000:1. If more than one organoaluminum compound and/or more than one activator-support are employed, this ratio is based on the total weight of each respective component. In an aspect, the weight ratio of the activator-support to the organoaluminum compound can be in a range from about 1:1 to about 500:1, from about 1:3 to about 200:1, or from about 1:1 to about 100:1.

Likewise, the weight ratio of metallocene compound(s) to activator-support(s) can be in a range from about 1:1 to about 1:1,000,000, or from about 1:5 to about 1:250,000. If more than one metallocene compound and/or more than one activator-support are employed, this ratio is based on the total weight of each respective component. In an aspect, the weight ratio of metallocene compound to activator-support can be in a range from about 1:10 to about 1:10,000, or from about 1:20 to about 1:1000.

In some aspects, the catalyst compositions and methods of their preparation are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, as discussed herein, in the absence of these additional materials. For example, a catalyst composition of the present invention can consist essentially of a solid metallocene compound, an activator-support, and an organoaluminum compound, wherein no other materials are present in the catalyst composition which would increase/decrease the activity of the catalyst composition by more than about 10% from the catalyst activity of the catalyst composition in the absence of said materials.

Metallocene Compounds

Metallocene-based catalyst compositions consistent with this invention can contain a bridged metallocene compound or an unbridged metallocene compound. The metallocene compound can comprise, for example, a transition metal (one or more than one) from Groups IIIB-VIIIB of the Periodic Table of the Elements. In one aspect, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in other aspects. Accordingly, the metallocene compound can comprise titanium, or zirconium, or hafnium, either singly or in combination.

In some aspects of this invention, the metallocene compound can comprise a bridged metallocene compound, e.g., with titanium, zirconium, or hafnium, such as a bridged zirconium or hafnium based metallocene compound with a fluorenyl group, and with no aryl groups on the bridging group, or a bridged zirconium or hafnium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group and/or on a cyclopentadienyl-type group (e.g., a cyclopentadienyl group, a fluorenyl group, etc.). In another aspect, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

In some aspects, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047, the disclosures of which are incorporated herein by reference in their entirety.

In some aspects of this invention, the metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047, the disclosures of which are incorporated herein by reference in their entirety.

Moreover, the metallocene compound can comprise an unbridged dinuclear metallocene such as those described in U.S. Pat. Nos. 7,919,639 and 8,080,681, the disclosures of which are incorporated herein by reference in their entirety. The metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

Aspects of this invention also are directed to catalyst compositions and methods of preparing catalyst compositions in which two or more metallocene compounds are employed, e.g., a dual metallocene catalyst composition. Independently, each respective metallocene compound can be any bridged metallocene compound disclosed herein or any unbridged metallocene compound disclosed herein.

Activator-Supports

The present invention encompasses various catalyst compositions containing an activator-support, and various methods of preparing catalyst compositions using an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from about 1 to about 25 wt. % of the electron-withdrawing anion, based on the weight of the activator-support. In particular aspects provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an aspect, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another aspect, the activator-support employed in the processes and catalyst systems described herein can be, or can comprise, a fluorided solid oxide and/or a sulfated solid oxide and/or a phosphated solid oxide, non-limiting examples of which can include fluorided alumina, sulfated alumina, phosphated alumina, fluorided silica-alumina, sulfated silica-alumina, phosphated silica-alumina, fluorided silica-zirconia, fluorided silica-coated alumina, sulfated silica-coated alumina, phosphated silica-coated alumina, and the like, as well as combinations thereof. In yet another aspect, the activator-support can comprise fluorided alumina; alternatively, chlorided alumina; alternatively, sulfated alumina; alternatively, phosphated alumina; alternatively, fluorided silica-alumina; alternatively, sulfated silica-alumina; alternatively, phosphated silica-alumina; alternatively, fluorided silica-zirconia; alternatively, chlorided silica-zirconia; alternatively, sulfated silica-coated alumina; alternatively, phosphated silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165, 929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, phosphated solid oxides, etc.) are well known to those of skill in the art.

Organoaluminum Compounds

The present invention encompasses various catalyst compositions containing an organoaluminum compound, and various methods of preparing catalyst compositions using an organoaluminum compound. More than one organoaluminum compound can be used. For instance, a mixture or combination of two suitable organoaluminum compounds can be used in the processes and catalyst systems disclosed herein.

In some aspects, suitable organoaluminum compounds can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. In other aspects, suitable organoaluminum compounds can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one aspect, each $X^7$ independently can be any hydrocarbyl having from 1 to 18 carbon atoms, or from 1 to 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain aspects of the present invention. According to another aspect of the present invention, each $X^8$ independently can be an alkoxide or an aryloxide, any one of which has from 1 to 18 carbon atoms, a halide, or a hydride. In yet another aspect of the present invention, each $X^8$ can be selected independently from fluorine and chlorine. In the formula, $Al(X^7)_m(X^8)_{3-m}$, m can be a number from 1 to 3 (inclusive) and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. In one aspect, an organoaluminum compound used in the processes and catalyst systems disclosed herein can comprise (or consist essentially of, or consist of) triethylaluminum (TEA), while in another aspect, an organoaluminum compound used in the processes and catalyst systems disclosed herein can comprise (or consist essentially of, or consist of) triisobutylaluminum (TIBA). Yet, in another aspect, a mixture of TEA and TIBA can be used as the organoaluminum component in the processes disclosed herein (or as the organoaluminum component in the catalyst systems disclosed herein).

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. For example, resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an aspect, the olefin monomer can comprise a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ α-olefin, a $C_3$-$C_{20}$ α-olefin, etc.). According to one aspect, the olefin monomer in the polymerization process can be ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect, the comonomer can comprise an α-olefin (e.g., a $C_3$-$C_{10}$ α-olefin), while in yet another aspect, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another aspect, the amount of comonomer introduced into a polymerization reactor can be from about 0.01 to about 40 weight percent comonomer based on the total weight of the monomer and comonomer. In still another aspect, the amount of comonomer introduced into a polymerization reactor can be from about 0.1 to about 35 weight percent comonomer based on the total weight of the monomer and comonomer. Yet, in another aspect, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be (or can comprise) an ethylene homopolymer, an ethylene/1-butene copolymer, an ethylene/1-hexene copolymer, or an ethylene/1-octene copolymer; or alternatively, an ethylene/1-hexene copolymer. In another aspect, the olefin polymer can be (or can comprise) a polypropylene homopolymer or a propylene-based copolymer. In some aspects, the olefin polymer can have a bimodal molecular weight distribution, while in other aspects, the olefin polymer can have a multimodal molecular weight distribution. Yet, in still other aspects, the olefin polymer can have a unimodal molecular weight distribution.

Polymerization Reactor Systems and Processes

The disclosed catalyst systems and methods of their preparation are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 110° C., or from about 75° C. to about 95° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

Also encompassed herein are olefin polymerization processes utilizing any of the catalyst compositions described herein. One such process can comprise contacting a catalyst composition with an olefin monomer and optionally an olefin comonomer in a polymerization reactor system under polymerization conditions to produce an olefin polymer. Generally, the polymerization process can utilize any olefin monomer and optional comonomer disclosed herein, and the catalyst composition employed can be a single (or dual) metallocene catalyst system utilizing, for instance, any of the solid metallocene compounds, any of activator-supports, and any of the organoaluminum compounds disclosed herein, and the catalyst system can be prepared by any of the processes disclosed herein.

A metallocene-based catalyst composition, in one aspect, can be produced by a process comprising (i) contacting an activator-support and a solid metallocene compound for a first period of time to form a precontacted mixture, and (ii) contacting the precontacted mixture with an organoaluminum compound for a second period of time to produce the catalyst composition. A metallocene-based catalyst composition, in another aspect, can be produced by a process comprising contacting, in any order (a) an activator-support, (b) a solid metallocene compound, and (c) an organoaluminum compound, to produce the catalyst composition.

Polymerization processes consistent with this invention can comprise contacting such catalyst compositions (i.e., prepared using a solid metallocene compound) with an olefin monomer and optionally an olefin comonomer in a polymerization reactor system under polymerization conditions to produce an olefin polymer. In an aspect, and unexpectedly, the catalyst activities of these catalyst compositions are greater (by any amount disclosed herein, e.g., at least about 1%, at least about 10%, at least about 25%, etc.) than that of a catalyst systems obtained by using a solution of the metallocene compound instead of the solid metallocene compound, under the same polymerization conditions. The same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the use of a solid metallocene compound instead of a solution of the metallocene compound in the preparation of the catalyst system, i.e., the metallocene compound as a solid component versus a liquid phase component.

This invention is also directed to, and encompasses, the polymers produced by any of the polymerization processes disclosed herein. Articles of manufacture can be formed from, and/or can comprise, the polymers (e.g., ethylene copolymers) of this invention and, accordingly, are encompassed herein. For example, articles which can comprise polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—*

*Process, Materials, Properties*, TAPPI Press, 1992; the disclosures of which are incorporated herein by reference in their entirety.

Applicants also contemplate a method for forming or preparing an article of manufacture comprising a polymer produced by any of the polymerization processes disclosed herein. For instance, a method can comprise (i) contacting any catalyst composition disclosed herein with an olefin monomer and an optional olefin comonomer under polymerization conditions in a polymerization reactor system to produce an olefin polymer (the catalyst composition can be prepared in accordance with any process disclosed herein); and (ii) forming an article of manufacture comprising the olefin polymer. The forming step can comprise blending, melt processing, extruding, molding, or thermoforming, and the like, including combinations thereof.

EXAMPLES

Aspects and embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Sulfated alumina activator-supports were prepared as follows. Bohemite was obtained from W.R. Grace & Company under the designation "Alumina A" and having a surface area of about 300 m²/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina ("SA") was collected and stored under dry nitrogen, and was used without exposure to the atmosphere.

Fluorided silica-coated alumina activator-supports were prepared as follows. Bohemite was obtained from W.R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % SiO₂. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina ("FSCA") was collected and stored under dry nitrogen, and was used without exposure to the atmosphere.

Examples 1-8

Catalytic Activity Improvement Resulting from the Use of a Solid Metallocene Compound, Instead of a Solution of the Metallocene Compound, During Catalyst Preparation The polymerization experiments of Examples 1-8 were conducted in a one-gallon (3.8-L) stainless steel reactor with 1.8 L of isobutane. Metallocene solutions with nominal 2 mg/mL of MET-A, MET-B, and MET-C were prepared by dissolving the respective metallocene in toluene. The metallocene compounds had the following structures:

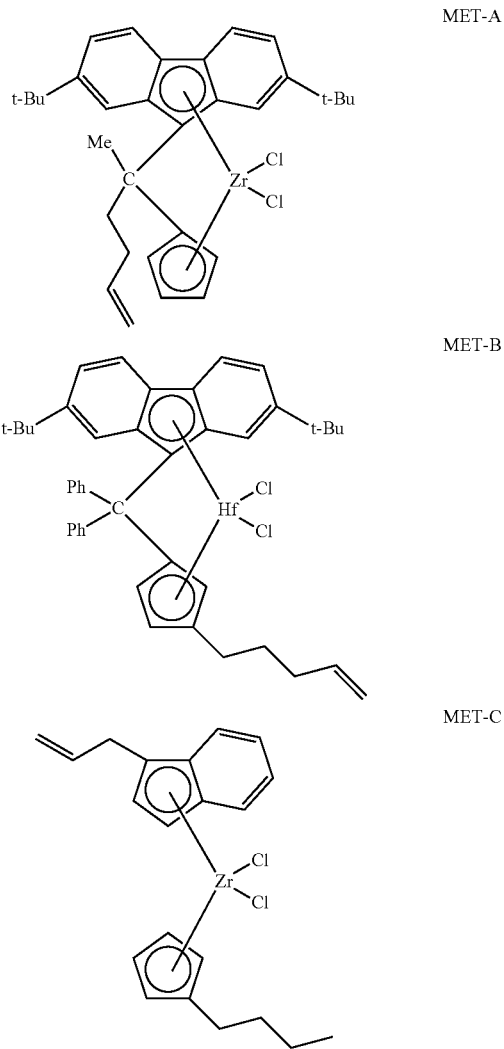

The polymerization experiments were performed as follows. In the "solution" catalyst preparation procedure, 0.6 mmol of triisobutylaluminum (TIBA, 0.6 mL of a 1M solution in heptane) was added to the reactor, followed by 100 mg of the activator-support (SA or FSCA), then a metallocene solution containing 2 mg of the respective metallocene compound, while venting isobutane vapor. The charge port was closed and 1.8 L of isobutane were added. The contents of the reactor were stirred and heated to the desired polymerization reaction temperature of 90° C., and ethylene was then introduced into the reactor. Ethylene was fed on demand to maintain the target pressure of 420 psig pressure for the 30 minute length of each polymerization experiment. The reactor was maintained at the desired reaction temperature throughout the experiment by an automated heating-cooling system.

In the "solid" catalyst preparation procedure, 100 mg of the activator-support (SA or FSCA) and 2 mg (dry solid) of the respective metallocene compound were mixed for a few minutes and then charged to the reactor while venting isobutane vapor. Then, 0.6 mmol of triisobutylaluminum (TIBA, 0.6 mL of a 1M solution in heptane) was added to the reactor. The charge port was closed and 1.8 L of isobutane were added. The contents of the reactor were stirred and heated to the desired polymerization reaction temperature of 90° C., and ethylene was then introduced into the reactor. Ethylene was fed on demand to maintain the target pressure of 420 psig pressure for the 30 minute length of each polymerization experiment. The reactor was maintained at the desired reaction temperature throughout the experiment by an automated heating-cooling system.

Table I summarizes certain catalyst components, the metallocene phase during catalyst preparation, and the amount of polymer produced for Examples 1-8. The last column in Table I lists the percentage improvement in catalyst activity achieved via the use of the solid metallocene during catalyst preparation instead of a solution of the metallocene compound. Unexpectedly, the use of the solid metallocene compound resulted in significant improvements in catalyst activity for all of the metallocene compounds: MET-A, MET-B, and MET-C. Furthermore, and quite surprisingly, the solid metallocene catalyst preparation resulted in remarkable increases in catalyst activity for the catalyst systems containing a bridged metallocene compound and sulfated alumina (SA): the increase in activity was 30-40% (see Examples 1-2 and Examples 5-6).

TABLE I

Summary of Examples 1-8.

| Example | Activator-Support | Metallocene Compound | Metallocene Weight | Metallocene Phase | PE Yield (grams) | Improvement (%) |
|---|---|---|---|---|---|---|
| 1 | SA | MET-A | 2 mg | Solution | 254.2 | 37.8 |
| 2 | SA | MET-A | 2 mg | Solid | 350.2 | |
| 3 | FSCA | MET-A | 2 mg | Solution | 398.6 | 1.5 |
| 4 | FSCA | MET-A | 2 mg | Solid | 404.7 | |
| 5 | SA | MET-B | 2 mg | Solution | 45.6 | 32.2 |
| 6 | SA | MET-B | 2 mg | Solid | 60.3 | |
| 7 | SA | MET-C | 2 mg | Solution | 187.3 | 15.0 |
| 8 | SA | MET-C | 2 mg | Solid | 215.5 | |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A process to produce a catalyst composition, the process comprising contacting, in any order:
(a) an activator-support;
(b) a solid metallocene compound; and
(c) an organoaluminum compound;
to produce the catalyst composition.

Embodiment 2

The process defined in embodiment 1, wherein the activator-support, the solid metallocene compound, and the organoaluminum compound are contacted for any time period sufficient to form the catalyst composition, e.g., from about 1 sec to about 48 hr, from about 30 sec to about 6 hr, at least about 5 sec, at least about 1 min, etc.

Embodiment 3

The process defined in embodiment 1 or 2, wherein the activator-support is present as a slurry of the activator-support in a first diluent.

Embodiment 4

The process defined in any one of embodiments 1-3, wherein the solid metallocene compound is present as a slurry of the solid metallocene compound in a second diluent.

Embodiment 5

The process defined in embodiment 3 or 4, wherein the first diluent and/or the second diluent comprise(s) a hydrocarbon that does not dissolve the solid metallocene compound.

Embodiment 6

The process defined in any one of embodiments 3-5, wherein the first diluent and/or the second diluent comprise(s) any suitable non-polar hydrocarbon, and the first diluent and the second diluent are the same or different.

Embodiment 7

The process defined in any one of embodiments 3-6, wherein the first diluent and/or the second diluent comprise(s) propane, cyclohexane, isobutane, n-butane, n-pentane, isopentane, neopentane, n-hexane, or combinations thereof.

Embodiment 8

The process defined in any one of embodiments 1-7, wherein the solid metallocene compound is not dissolved into solution during the process.

Embodiment 9

The process defined in any one of embodiments 1-8, wherein the organoaluminum compound is present as a solution in any suitable hydrocarbon solvent.

Embodiment 10

The process defined in embodiment 9, wherein the hydrocarbon solvent comprises cyclohexane, isobutane, n-butane, n-pentane, isopentane, neopentane, hexane, heptane, or combinations thereof.

Embodiment 11

The process defined in any one of embodiments 1-10, wherein the activator-support and/or the solid metallocene compound is/are present as a dry solid.

Embodiment 12

A catalyst composition produced by the process defined in any one of embodiments 1-11.

Embodiment 13

A catalyst composition comprising:
(a) an activator-support;
(b) a solid metallocene compound; and
(c) an organoaluminum compound.

Embodiment 14

The process or composition defined in any one of embodiments 1-13, wherein an activity of the catalyst composition is greater (by any amount disclosed herein, e.g., at least about 1%, at least about 10%, at least about 25%, etc.) than that of a catalyst system obtained by using a solution of the metallocene compound instead of the solid metallocene compound, under the same polymerization conditions.

Embodiment 15

The process or composition defined in any one of embodiments 1-14, wherein an activity of the catalyst composition is from about 1% to about 100% greater, or from about 5% to about 50% greater, etc., than that of a catalyst system obtained by using a solution of the metallocene compound instead of the solid metallocene compound, under the same polymerization conditions.

Embodiment 16

A process to produce a catalyst composition, the process comprising:
(i) contacting an activator-support and a solid metallocene compound for a first period of time to form a precontacted mixture; and
(ii) contacting the precontacted mixture with an organoaluminum compound for a second period of time to produce the catalyst composition.

Embodiment 17

The process defined in embodiment 16, wherein the first period of time is any time period sufficient to form the precontacted mixture, e.g., from about 10 sec to about 48 hr, from about 30 sec to about 6 hr, at least about 5 sec, at least about 1 min, etc.

Embodiment 18

The process defined in embodiment 16 or 17, wherein the second period of time is any time period sufficient to form the catalyst composition, e.g., from about 1 sec to about 48 hr, from about 1 min to about 6 hr, at least about 5 min, at least about 10 min, etc.

Embodiment 19

The process defined in any one of embodiments 16-18, wherein the activator-support is present as a slurry of the activator-support in a first diluent.

Embodiment 20

The process defined in any one of embodiments 16-19, wherein the solid metallocene compound is present as a slurry of the solid metallocene compound in a second diluent.

Embodiment 21

The process defined in embodiment 19 or 20, wherein the first diluent and/or the second diluent comprise(s) a hydrocarbon that does not dissolve the solid metallocene compound.

Embodiment 22

The process defined in any one of embodiments 19-21, wherein the first diluent and/or the second diluent comprise(s) any suitable non-polar hydrocarbon, and the first diluent and the second diluent are the same or different.

Embodiment 23

The process defined in any one of embodiments 19-22, wherein the first diluent and/or the second diluent comprise(s) propane, cyclohexane, isobutane, n-butane, n-pentane, isopentane, neopentane, n-hexane, or combinations thereof.

Embodiment 24

The process defined in any one of embodiments 16-23, wherein the solid metallocene compound is not dissolved into solution during the process.

Embodiment 25

The process defined in any one of embodiments 16-24, wherein the organoaluminum compound is present as a solution in any suitable hydrocarbon solvent.

Embodiment 26

The process defined in embodiment 25, wherein the hydrocarbon solvent comprises cyclohexane, isobutane, n-butane, n-pentane, isopentane, neopentane, hexane, heptane, or combinations thereof.

Embodiment 27

The process defined in any one of embodiments 16-26, wherein the activator-support and/or the solid metallocene compound is/are present as a dry solid.

Embodiment 28

A catalyst composition produced by the process defined in any one of embodiments 16-27.

Embodiment 29

A catalyst composition comprising:
(i) a precontacted mixture comprising:
an activator-support, and
a solid metallocene compound; and
(ii) an organoaluminum compound.

Embodiment 30

The process or composition defined in any one of embodiments 16-29, wherein an activity of the catalyst composition is greater (by any amount disclosed herein, e.g., at least about 1%, at least about 10%, at least about 25%, etc.) than that of a catalyst system obtained by using a solution of the metallocene compound instead of the solid metallocene compound, under the same polymerization conditions.

Embodiment 31

The process or composition defined in any one of embodiments 16-30, wherein an activity of the catalyst composition is from about 1% to about 100% greater, or from about 5% to about 50% greater, etc., than that of a catalyst system obtained by using a solution of the metallocene compound instead of the solid metallocene compound, under the same polymerization conditions. Embodiment 32. The process or composition defined in any one of embodiments 1-31, wherein the activator-support comprises a solid oxide treated with an electron-withdrawing anion, for example, comprising any solid oxide treated with any electron-withdrawing anion disclosed herein.

Embodiment 33

The process or composition defined in embodiment 32, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, or any combination thereof.

Embodiment 34

The process or composition defined in any one of embodiments 1-32, wherein the activator-support comprises a fluorided solid oxide, a sulfated solid oxide, a phosphated solid oxide, or a combination thereof.

Embodiment 35

The process or composition defined in any one of embodiments 1-32, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 36

The process or composition defined in any one of embodiments 1-32, wherein the activator-support comprises fluorided alumina, fluorided silica-alumina, fluorided silica-zirconia, fluorided silica-coated alumina, or any combination thereof (e.g., fluorided silica-alumina or fluorided silica-coated alumina).

Embodiment 37

The process or composition defined in any one of embodiments 1-32, wherein the activator-support comprises sulfated alumina, sulfated silica-alumina, sulfated silica-coated alumina, or any combination thereof (e.g., sulfated alumina).

Embodiment 38

The process or composition defined in any one of embodiments 1-37, wherein the activator-support further comprises any metal or metal ion disclosed herein, e.g., zinc, nickel, vanadium, titanium, silver, copper, gallium, tin, tungsten, molybdenum, zirconium, or any combination thereof.

Embodiment 39

The process or composition defined in any one of embodiments 1-38, wherein the organoaluminum compound comprises any organoaluminum compound disclosed herein.

Embodiment 40

The process or composition defined in any one of embodiments 1-39, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 41

The process or composition defined in embodiment 39 or 40, wherein the organoaluminum compound comprises triethylaluminum.

Embodiment 42

The process or composition defined in embodiment 39 or 40, wherein the organoaluminum compound comprises triisobutylaluminum.

Embodiment 43

The process or composition defined in any one of embodiments 1-42, wherein the catalyst composition is substantially free of aluminoxane compounds, organoboron or organoborate compounds, ionizing ionic compounds, or combinations thereof.

Embodiment 44

The process or composition defined in any one of embodiments 1-43, wherein the metallocene compound comprises a bridged metallocene compound, e.g., any bridged metallocene compound disclosed herein.

Embodiment 45

The process or composition defined in any one of embodiments 1-44, wherein the metallocene compound comprises a bridged zirconium based metallocene compound with a fluorenyl group, and with no aryl groups on the bridging group.

Embodiment 46

The process or composition defined in any one of embodiments 1-44, wherein the metallocene compound comprises a bridged zirconium based metallocene compound with a cyclopentadienyl group and a fluorenyl group, and with no aryl groups on the bridging group.

Embodiment 47

The process or composition defined in any one of embodiments 1-44, wherein the metallocene compound comprises a bridged zirconium or hafnium based metallocene compound with a fluorenyl group, and an aryl group on the bridging group.

Embodiment 48

The process or composition defined in any one of embodiments 1-44, wherein the metallocene compound comprises a bridged zirconium or hafnium based metallocene compound with a cyclopentadienyl group and fluorenyl group, and an aryl group on the bridging group.

Embodiment 49

The process or composition defined in any one of embodiments 1-44, wherein the metallocene compound comprises a bridged zirconium based metallocene compound with a fluorenyl group, and an aryl group on the bridging group.

Embodiment 50

The process or composition defined in any one of embodiments 1-44, wherein the metallocene compound comprises a bridged hafnium based metallocene compound with a fluorenyl group, and an aryl group on the bridging group.

Embodiment 51

The process or composition defined in any one of embodiments 47-50, wherein the aryl group is a phenyl group.

Embodiment 52

The process or composition defined in any one of embodiments 1-44, wherein the metallocene compound comprises a bridged zirconium or hafnium based metallocene compound with a cyclopentadienyl group and a fluorenyl group, and with an alkenyl substituent.

Embodiment 53

The process or composition defined in any one of embodiments 1-44, wherein the metallocene compound comprises a bridged zirconium or hafnium based metallocene compound with two indenyl groups.

Embodiment 54

The process or composition defined in any one of embodiments 1-44, wherein the metallocene compound comprises a bridged zirconium based metallocene compound with two indenyl groups.

Embodiment 55

The process or composition defined in any one of embodiments 53-54, wherein the bridging group contains a silicon atom.

Embodiment 56

The process or composition defined in any one of embodiments 1-43, wherein the metallocene compound comprises an unbridged metallocene compound, e.g., any unbridged metallocene compound disclosed herein.

Embodiment 57

The process or composition defined in any one of embodiments 1-43, wherein the metallocene compound comprises an unbridged zirconium or hafnium based metallocene compound containing two cyclopentadienyl groups, two indenyl groups, or a cyclopentadienyl and an indenyl group.

Embodiment 58

The process or composition defined in any one of embodiments 1-43, wherein the metallocene compound comprises an unbridged zirconium based metallocene compound containing two cyclopentadienyl groups, two indenyl groups, or a cyclopentadienyl and an indenyl group.

Embodiment 59

The process or composition defined in any one of embodiments 1-43, wherein the metallocene compound comprises an unbridged zirconium based homodinuclear metallocene compound.

Embodiment 60

The process or composition defined in any one of embodiments 1-43, wherein the metallocene compound comprises an unbridged hafnium based homodinuclear metallocene compound.

Embodiment 61

The process or composition defined in any one of embodiments 1-43, wherein the metallocene compound comprises an unbridged heterodinuclear metallocene compound.

Embodiment 62

The process or composition defined in any one of embodiments 1-61, wherein the weight ratio of the metallocene compound to the activator-support is in any range of weight ratios disclosed herein, e.g., from about 1:1 to about 1:1,000,000, from about 1:10 to about 1:10,000, from about 1:20 to about 1:1000, etc.

Embodiment 63

The process or composition defined in any one of embodiments 1-62, wherein the weight ratio of the activator-support to the organoaluminum compound is in any range of weight ratios disclosed herein, e.g., from about 1:5 to about 1000:1, from about 1:3 to about 200:1, from about 1:1 to about 100:1, etc.

Embodiment 64

An olefin polymerization process, the process comprising contacting the catalyst composition defined in any one of embodiments 1-63 with an olefin monomer and an optional olefin comonomer in a polymerization reactor system under polymerization conditions to produce an olefin polymer.

Embodiment 65

The process defined in embodiment 64, wherein the olefin monomer comprises any olefin monomer disclosed herein, e.g., any $C_2$-$C_{20}$ olefin.

Embodiment 66

The process defined in embodiment 64, wherein the olefin monomer and the optional olefin comonomer independently comprise a $C_2$-$C_{20}$ alpha-olefin.

Embodiment 67

The process defined in any one of embodiments 64-66, wherein the olefin monomer comprises ethylene.

Embodiment 68

The process defined in any one of embodiments 64-67, wherein the catalyst composition is contacted with ethylene and an olefin comonomer comprising a $C_3$-$C_{10}$ alpha-olefin.

Embodiment 69

The process defined in any one of embodiments 64-68, wherein the catalyst composition is contacted with ethylene and an olefin comonomer comprising 1-butene, 1-hexene, 1-octene, or a mixture thereof.

Embodiment 70

The process defined in any one of embodiments 64-66, wherein the olefin monomer comprises propylene.

Embodiment 71

The process defined in any one of embodiments 64-70, wherein the polymerization reactor system comprises a batch reactor, a slurry reactor, a gas-phase reactor, a solution reactor, a high pressure reactor, a tubular reactor, an autoclave reactor, or a combination thereof.

Embodiment 72

The process defined in any one of embodiments 64-71, wherein the polymerization reactor system comprises a slurry reactor, a gas-phase reactor, a solution reactor, or a combination thereof.

Embodiment 73

The process defined in any one of embodiments 64-72, wherein the polymerization reactor system comprises a loop slurry reactor.

Embodiment 74

The process defined in any one of embodiments 64-73, wherein the polymerization reactor system comprises a single reactor.

Embodiment 75

The process defined in any one of embodiments 64-73, wherein the polymerization reactor system comprises 2 reactors.

Embodiment 76

The process defined in any one of embodiments 64-73, wherein the polymerization reactor system comprises more than 2 reactors.

Embodiment 77

The process defined in any one of embodiments 64-76, wherein the olefin polymer comprises any olefin polymer disclosed herein.

Embodiment 78

The process defined in any one of embodiments 64-77, wherein the olefin polymer is an ethylene homopolymer, an ethylene/1-butene copolymer, an ethylene/1-hexene copolymer, or an ethylene/1-octene copolymer.

Embodiment 79

The process defined in any one of embodiments 64-77, wherein the olefin polymer is an ethylene/1-hexene copolymer.

Embodiment 80

The process defined in any one of embodiments 64-77, wherein the olefin polymer is a polypropylene homopolymer or a propylene-based copolymer.

Embodiment 81

An olefin polymer produced by the olefin polymerization process defined in any one of embodiments 64-80.

Embodiment 82

An article comprising the olefin polymer defined in embodiment 81.

Embodiment 83

A method or forming or preparing an article of manufacture comprising an olefin polymer, the method comprising (i) performing the olefin polymerization process defined in any one of embodiments 64-80 to produce the olefin polymer, and (ii) forming the article of manufacture comprising the olefin polymer, e.g., via any technique disclosed herein.

Embodiment 84

The article defined in embodiment 82 or 83, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A process to produce a catalyst composition, the process comprising:
   (i) contacting an activator-support and a solid metallocene compound for a first period of time to form a precontacted mixture; and
   (ii) contacting the precontacted mixture with an organoaluminum compound for a second period of time to produce the catalyst composition;
   wherein an activity of the catalyst composition is from about 5% to about 100% greater than that of a catalyst system obtained by using a solution of the metallocene compound instead of the solid metallocene compound, under the same polymerization conditions.

2. The process of claim 1, wherein in step (i), a slurry of the activator-support in a first diluent is contacted with a slurry of the solid metallocene compound in a second diluent.

3. The process of claim 1, wherein in step (i), at least one of the activator-support and the solid metallocene compound is a dry solid.

4. The process of claim 1, wherein:
   the activator-support comprises a fluorided solid oxide, a sulfated solid oxide, a phosphated solid oxide, or a combination thereof; and
   the solid metallocene compound comprises a bridged zirconium or hafnium based metallocene compound with a cyclopentadienyl group and a fluorenyl group.

5. The process of claim 1, wherein:
   the first period of time is at least about 15 seconds; and
   the activity of the catalyst composition is from about 5% to about 75% greater than that of a catalyst system obtained by using a solution of the metallocene compound instead of the solid metallocene compound, under the same polymerization conditions.

6. The process of claim 1, wherein:
   the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof; and
   the activator-support comprises fluorided silica-alumina, fluorided silica-coated alumina, sulfated alumina, or a combination thereof.

7. The process of claim 1, wherein:
   a weight ratio of the solid metallocene compound to the activator-support is in a range from about 1:10 to about 1:10,000; and
   a weight ratio of the activator-support to the organoaluminum compound is in a range from about 1:5 to about 1000:1.

8. A process to produce a catalyst composition, the process comprising contacting, in any order:
   (a) an activator-support;
   (b) a solid metallocene compound; and
   (c) an organoaluminum compound;
   to produce the catalyst composition;
   wherein an activity of the catalyst composition is from about 5% to about 100% greater than that of a catalyst system obtained by using a solution of the metallocene compound instead of the solid metallocene compound, under the same polymerization conditions.

9. The process of claim 8, wherein the process comprises comprising contacting a slurry of the activator-support in a first diluent, a slurry of the solid metallocene compound in a second diluent, and the organoaluminum compound.

10. The process of claim 8, wherein the process comprises comprising contacting a slurry of the activator-support in a first diluent, a slurry of the solid metallocene compound in a second diluent, and a solution of the organoaluminum compound.

11. The process of claim 8, wherein at least one of the activator-support and the solid metallocene compound is a dry solid.

12. The process of claim 8, wherein:
    the solid metallocene compound comprises a bridged metallocene compound; and
    the activator-support comprises sulfated alumina.

13. The process of claim 8, wherein:
    the activator-support comprises a fluorided solid oxide, a sulfated solid oxide, or a combination thereof;
    the organoaluminum compound comprises trimethylaluminum, triethylaluminum, tri-n-propylaluminum, tri-n-butylaluminum, triisobutylaluminum, or any combination thereof; and
    the solid metallocene compound comprises an unbridged zirconium or hafnium based metallocene compound containing two cyclopentadienyl groups, two indenyl groups, or a cyclopentadienyl and an indenyl group.

14. The process of claim 8, wherein the activity of the catalyst composition is from about 5% to about 75% greater than that of a catalyst system obtained by using a solution of the metallocene compound instead of the solid metallocene compound, under the same polymerization conditions.

15. The process of claim 1, wherein:
    the activator-support comprises a fluorided solid oxide and/or a sulfated solid oxide; and
    the solid metallocene compound comprises a bridged zirconium or hafnium based metallocene compound with a cyclopentadienyl group and a fluorenyl group, and with an alkenyl substituent.

16. The process of claim 15, wherein the activator-support comprises fluorided silica-alumina, fluorided silica-coated alumina, sulfated alumina, or a combination thereof.

17. The process of claim 1, wherein:
    the activator-support comprises a fluorided solid oxide and/or a sulfated solid oxide; and
    the solid metallocene compound comprises an unbridged zirconium based metallocene compound containing two cyclopentadienyl groups, two indenyl groups, or a cyclopentadienyl and an indenyl group.

18. The process of claim 2, wherein the first diluent and the second diluent independently comprise propane, cyclohexane, isobutane, n-butane, n-pentane, isopentane, neopentane, n-hexane, or combinations thereof.

19. The process of claim 8, wherein:
    the activator-support comprises a fluorided solid oxide and/or a sulfated solid oxide; and
    the solid metallocene compound comprises a bridged zirconium or hafnium based metallocene compound with a cyclopentadienyl group and a fluorenyl group, and with an alkenyl substituent.

20. The process of claim 19, wherein the activator-support comprises fluorided silica-alumina, fluorided silica-coated alumina, sulfated alumina, or a combination thereof.

21. The process of claim 9, wherein the first diluent and the second diluent independently comprise propane, cyclohexane, isobutane, n-butane, n-pentane, isopentane, neopentane, n-hexane, or combinations thereof.

22. The process of claim 13, wherein:
the activator-support comprises fluorided silica-alumina, fluorided silica-coated alumina, sulfated alumina, or a combination thereof; and
the solid metallocene compound comprises an unbridged zirconium based metallocene compound containing a cyclopentadienyl and an indenyl group, and with an alkenyl substituent.

* * * * *